(12) United States Patent
Mizuno et al.

(10) Patent No.: US 11,777,135 B2
(45) Date of Patent: Oct. 3, 2023

(54) 3D MAGNESIUM BATTERY AND METHOD OF MAKING THE SAME

(71) Applicants: Toyota Motor Engineering & Manufacturing North America, Inc., Plano, TX (US); Toyota Jidosha Kabushiki Kaisha, Toyota (JP)

(72) Inventors: Fuminori Mizuno, Miyoshi (JP); Rana Mohtadi, Northville, MI (US); Oscar Tutusaus, Ann Arbor, MI (US); Nikhilendra Singh, Ypsilanti, MI (US); Timothy S. Arthur, Ann Arbor, MI (US); Ruidong Yang, Ann Arbor, MI (US); Kensuke Takechi, Ann Arbor, MI (US); Chen Ling, Ann Arbor, MI (US); Ruigang Zhang, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 529 days.

(21) Appl. No.: 15/931,840

(22) Filed: May 14, 2020

(65) Prior Publication Data

US 2020/0274187 A1  Aug. 27, 2020

Related U.S. Application Data

(62) Division of application No. 15/715,915, filed on Sep. 26, 2017, now Pat. No. 10,680,280.

(51) Int. Cl.
*H01M 10/054* (2010.01)
*H01M 4/46* (2006.01)
(Continued)

(52) U.S. Cl.
CPC ......... *H01M 10/054* (2013.01); *H01M 4/134* (2013.01); *H01M 4/136* (2013.01);
(Continued)

(58) Field of Classification Search
None
See application file for complete search history.

(56) References Cited

U.S. PATENT DOCUMENTS

| | | | |
|---|---|---|---|
| 3,305,569 A | 2/1967 | Skoog | |
| 3,458,580 A | 7/1969 | Grafstein et al. | |

(Continued)

FOREIGN PATENT DOCUMENTS

| | | | |
|---|---|---|---|
| JP | 2011122202 A | 6/2011 | |
| JP | 2012038697 A | 2/2012 | |

(Continued)

OTHER PUBLICATIONS

Arthur, T. et al., "Three-dimensional electrodes and battery architectures," MRS Bulletin, vol. 36, pp. 523-531 (2011).
(Continued)

*Primary Examiner* — Haixia Zhang
(74) *Attorney, Agent, or Firm* — Christopher G. Darrow; Darrow Mustafa PC (57) ABSTRACT

3-D magnesium voltaic cells have a magnesium anode coated on multiple opposing surfaces with a continuous protective/electrolyte layer that is ionically conductive and electronically insulating. The resulting protected 3-D magnesium anode is coated on multiple opposing surfaces with a continuous cathode layer that is electronically and ionically conductive, and includes a magnesium storage medium. Suitable magnesium anodes, in particular, magnesium foam anodes, can be made by pulsed galvanostatic deposition of magnesium on a copper substrate. The protective layer can be formed by electropolymerization of a
(Continued)

suitable methylacrylate ester. The continuous cathode layer can be a slurry cathode having powders of an electronic conductor and a reversible magnesium storage component suspended in a magnesium electrolyte solution.

19 Claims, 10 Drawing Sheets

(51) Int. Cl.
*H01M 10/04* (2006.01)
*H01M 4/66* (2006.01)
*H01M 4/62* (2006.01)
*H01M 4/136* (2010.01)
*H01M 4/80* (2006.01)
*H01M 4/134* (2010.01)
H01M 4/04 (2006.01)

(52) U.S. Cl.
CPC .............. *H01M 4/62* (2013.01); *H01M 4/661* (2013.01); *H01M 4/808* (2013.01); *H01M 10/0445* (2013.01); *H01M 10/0468* (2013.01); *H01M 4/0416* (2013.01); *H01M 4/466* (2013.01); *H01M 10/04* (2013.01)

(56) References Cited

U.S. PATENT DOCUMENTS

| | | | |
|---|---|---|---|
| 4,397,925 | A | 8/1983 | Magahed |
| 4,448,856 | A | 5/1984 | Zuckerbrod et al. |
| 4,808,282 | A | 2/1989 | Gregory |
| 5,145,752 | A | 9/1992 | Goldstein et al. |
| 5,714,279 | A | 2/1998 | Zajac, Jr. et al. |
| 6,013,393 | A | 1/2000 | Taniuchi et al. |
| 6,316,141 | B1 | 11/2001 | Aurbach et al. |
| 6,383,688 | B1 | 5/2002 | Inagaki et al. |
| 7,419,623 | B2 | 9/2008 | Ivanov et al. |
| 7,927,507 | B1 | 4/2011 | Li et al. |
| 8,703,329 | B2 | 4/2014 | Barbarich et al. |
| 9,252,458 | B2 | 2/2016 | Mohtadi et al. |
| 9,362,593 | B2 | 6/2016 | Mohtadi |
| 9,362,594 | B2 | 6/2016 | Mohtadi |
| 9,431,678 | B2 | 8/2016 | Tutusaus et al. |
| 9,455,473 | B1 | 9/2016 | Mohtadi et al. |
| 9,640,836 | B1 | 5/2017 | Mohtadi et al. |
| 9,789,554 | B2 | 10/2017 | Jin et al. |
| 2002/0110739 | A1 | 8/2002 | McEwen et al. |
| 2004/0002002 | A1 | 1/2004 | Mizuta et al. |
| 2005/0016840 | A1 | 1/2005 | Petillo |
| 2005/0164093 | A1 | 7/2005 | Otsuki et al. |
| 2007/0048605 | A1 | 3/2007 | Pez et al. |
| 2009/0023074 | A1 | 1/2009 | Matsui et al. |
| 2009/0098458 | A1* | 4/2009 | Fujii ...................... H01M 4/02 429/209 |
| 2010/0021799 | A1 | 1/2010 | Rieke |
| 2010/0141211 | A1 | 6/2010 | Yazami |
| 2010/0266907 | A1* | 10/2010 | Yazami ................... H01M 4/72 429/405 |
| 2011/0076572 | A1 | 3/2011 | Amine et al. |
| 2011/0117440 | A1 | 5/2011 | Maekawa et al. |
| 2011/0229772 | A1 | 9/2011 | Fujinami et al. |
| 2011/0262804 | A1 | 10/2011 | Muldoon et al. |
| 2012/0107698 | A1 | 5/2012 | Muldoon et al. |
| 2012/0114979 | A1 | 5/2012 | Kim et al. |
| 2012/0196182 | A1 | 8/2012 | Yao et al. |
| 2013/0022875 | A1 | 1/2013 | Tojigamor et al. |
| 2013/0034780 | A1 | 2/2013 | Muldoon et al. |
| 2013/0316249 | A1 | 11/2013 | Higashi et al. |
| 2014/0038037 | A1 | 2/2014 | Mohtadi et al. |
| 2014/0038061 | A1 | 2/2014 | Mohtadi et al. |
| 2014/0154592 | A1 | 6/2014 | Mohtadi et al. |
| 2014/0302400 | A1 | 10/2014 | Shao et al. |
| 2014/0349178 | A1 | 11/2014 | Mohtadi et al. |
| 2014/0349199 | A1 | 11/2014 | Mohtadi et al. |
| 2015/0072250 | A1 | 3/2015 | Mohtadi |
| 2015/0229000 | A1 | 8/2015 | Shao et al. |
| 2015/0311565 | A1 | 10/2015 | Muldoon et al. |
| 2015/0325881 | A1 | 11/2015 | Mohtadi |
| 2016/0181662 | A1 | 6/2016 | Tutusaus et al. |
| 2017/0279151 | A1* | 9/2017 | Ling ..................... H01M 4/466 |

FOREIGN PATENT DOCUMENTS

| | | | |
|---|---|---|---|
| JP | 2013073839 | A | 4/2013 |
| JP | 2013131366 | A | 7/2013 |
| WO | 1996031519 | A1 | 10/1996 |
| WO | 2011131959 | A1 | 10/2011 |
| WO | WO-2013112135 | A1 * | 8/2013 ........... H01M 10/05 |
| WO | 2014031373 | A1 | 2/2014 |

OTHER PUBLICATIONS

Zheng, W. et al., "Preparation of porous Mg electrode by electrodeposition", Trans. Nonferrous Met. Soc. China, 21, pp. 2099-2103 (2011).
Kar, M., "Novel Alkoxy-Ammonium based Ionic Liquids for Reversible Zinc Electrochemistry," Thesis, 169 pages (2014).
MacFarland, D. et al., "Energy applications of ionic liquids," Energy Environ. Sci., vol. 7, No. 1, pp. 232-250 (2014).
Amir et al, "Progress in nonaqueous magnesium electrochemistry", Journal of Power Sources, 174 pp. 1234-1240 (2007).
Aurbach, D. et al., "Prototype systems for rechargeable magnesium batteries", Nature, vol. 407, pp. 724-727, (2000).
Carter, T.J. et al., "Boron Clusters as Highly Stable Magnesium-Battery Electrolytes", Angew. Chem. Int. Ed., vol. 53, pp. 3173-3177 (2014).
Dymon, J. et al., "Designing ionic liquids with boron cluster anions: alkylpyridinium and imidazolium [nido-C2B9H11] and [closo-CB11H12] carborane salts," Dalton Trans., pp. 2999-3006 (2013).
Gao et al., "A Carbonium Pseudo Ionic Liquid with Excellent Extractive Desulfurization Performance" pp. 948-958 (2012).
Guo, Y. et al., "Boron-based electrolyte solutions with wide electrochemical windows for rechargeable magnesium batteries", Energy Environ. Sci., 5, pp. 9100-9106 (2012).
Ha, Sy et al., "Magnesium(II) Bis(trifluoromethane sulfonyl) Imide-Based Electrolytes with Wide Eletrochemical Windows for Rechargeable Magnesium Batteries", ACS Applied Materials & Interfaces, vol. 6, No. 6, pp. 4063-4073 (2014).
Higashi, S. et al., "A novel inorganic solid state ion conductor for rechargeable Mg batteries," Chem. Commun., 50, pp. 1320-1322 (2014).
Hosmane, N., "Boron Science, New Technologies and Applications", CRC Press, 5 pages (2011) ISBN: 978-1-4398-2662-1.
Jenne, C. et al., "Alkoxy substituted halogenated closododecaborates as anions for ionic liquids", Dalton Trans., 44, pp. 13119-13124 (2015).
Kar, M. et al., Ionic liquid electrolytes for reversible magnesium electrochemistry, Chem. Comm, 52, pp. 4033-4036 (2016). (Uploaded in 4 parts).
Korbe, S. et al., "Chemistry of the Carba-closo-dodecaborate(-) Anion, CB11H12-", 106, Chem. Rev. pp. 5208-5249 (2006).
Larsen, A. et al., "Designing Ionic Liquids: Imidazolium Melts with Inert Carborane Anions", J. Am. Chem. Soc., 122, pp. 7264-7272 (2000).
Liu, S. et al., Carborane-Derivatized Low-Melting Salts with Ether-Functionalized Cations—Preparation and Properties, Euro J. Inorg. Chem., pp. 1910-1920 (2011).
Mohtadi, R. et al., "Magnesium Borohydride: From Hydrogen Storage to Magnesium Battery" pp. 9780-9783 (2012).
Mohtadi, R. et al., "Magnesium batteries: Current state of the art, issues and future perspectives," Beilstein J. Nanotechnol. 5, pp. 1291-1311 (2014).
Muldoon, J. et al., "Electrolyte roadblocks to a magnesium rechargeable battery", Energy Environ. Sci., 5, pp. 5941-5950 (2012).
Nieuwenhuyzen et al., "Ionic Liquids Containing Boron Cluster Anions", Inorg. Chem., vol. 48, pp. 889-901 (2009).

(56) References Cited

OTHER PUBLICATIONS

Tutusauas, O. et al., "Paving the Way Towards Highly Stable and Practical Electrolytes for Rechargeable Magnesium Batteries", ChemElectroChem, 2(1), pp. 51-57 (2015).
Plesek, J., "Potential Applications of the Boron Cluster Compounds", Chem. Rev., 92, pp. 269-278 (1992).
Pommerin, A. et al., "Influence of the Ball Milling Conditions on the Preparation of Rare Earth Aluminum Hydrides", Scripta Materialia, vol. 63, pp. 1128-1131 (2010).
Shelly, K. et al., "η1-Benzene Coordination: The Synthesis and X-ray Crystal Structure of a Novel Silver Salt of the Weakly Coordinating Carborane Anion B11CH12-", J. Am. Chem. Soc., 107, pp. 5955-5959 (1985).
Tutusaus, O. et al., "An Efficient Halogen-Free Electrolyte for Use in Rechargeable Magnesium Batteries", Angewandte Chemie, vol. 54, No. 27, pp. 7900-7904 (2015).
Yoo, H.D. et al., "Mg rechargeable batteries: an on-going challenge," Energy Environ. Sci., 6, pp. 2265-2279 (2013).
Zhou, N., et al., "Investigations on a series of novel ionic liquids containing the [closo-B12CI12]22 dianion", RSC Advances, 2, pp. 9830-9838 (2012).

\* cited by examiner

3D MAGNESIUM BATTERY AND METHOD OF MAKING THE SAME

CROSS-REFERENCE TO RELATED APPLICATIONS

The present application is a Divisional of U.S. patent application Ser. No. 15/715,915, filed Sep. 26, 2017, incorporated herein by reference in its entirety.

TECHNICAL FIELD

The present disclosure generally relates to magnesium batteries, and more particularly, to 3-dimensional magnesium batteries.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Conventional two dimensional battery architectures employ discrete, typically planar anode and cathode layers separated by electrolyte, with active ions traveling in a single direction from anode to cathode during discharge. Three dimensional (3-D) battery architectures, where the cathode surrounds, or is interspersed with, the anode, involve active ion travel in many or all directions during discharge. Such 3-D architectures have the potential to minimize cell dead space, and increase energy density and power density.

Li-ion batteries are the current state of the art in many applications for secondary batteries, including in personal electronics and automotive vehicles. Magnesium batteries have the potential to supplant Li-ion batteries, based on high volumetric capacity, a greatly diminished capacity to form anodic dendrites, and decreased expense resulting from the natural abundance of magnesium.

3-D battery designs have been reported for Li-ion batteries, but not for magnesium batteries. In particular, preparation of 3-D magnesium anodes, suitable electrolytes, and cathodes have not been developed. Accordingly, it would be desirable to develop 3-D battery systems for magnesium batteries.

SUMMARY

This section provides a general summary of the disclosure, and is not a comprehensive disclosure of its full scope or all of its features.

In various aspects, the present teachings provide a 3-D magnesium voltaic cell. The cell includes a magnesium foam anode; a continuous protective layer contacting the magnesium foam anode on substantially all surfaces; the protective layer being electrically insulative and ionically conductive; and a continuous cathode slurry layer contacting substantially all surfaces of the protective layer, the cathode layer comprising: a reversible magnesium storage component; an electronic conductor; and a magnesium ion conductor.

In other aspects, the present teachings provide A method of making a 3-D magnesium voltaic cell, comprising: contacting a magnesium anode on at least two opposing sides with a continuous protective layer, to form a protected 3-D magnesium anode; contacting at least two opposing surfaces of the continuous protective layer of the protected 3-D magnesium anode with a continuous cathode layer.

In still other aspects, the present teachings provide a 3-D magnesium voltaic cell. The cell includes a magnesium anode that contains magnesium metal when at least partially charged The cell also includes a continuous protective layer contacting the anode on at least two opposing surfaces, to form a protected anode, the protective layer being electrically insulative and ionically conductive. The cell further includes a continuous cathode layer contacting the continuous protective layer of the protected anode on at least two opposing surfaces. The continuous cathode layer includes a reversible active material storage component; an electronic conductor; and an ionic conductor.

Further areas of applicability and various methods of enhancing the above coupling technology will become apparent from the description provided herein. The description and specific examples in this summary are intended for purposes of illustration only and are not intended to limit the scope of the present disclosure.

BRIEF DESCRIPTION OF THE DRAWINGS

The present teachings will become more fully understood from the detailed description and the accompanying drawings, wherein.

It should be noted that the figures set forth herein are intended to exemplify the general characteristics of the methods, algorithms, and devices among those of the present technology, for the purpose of the description of certain aspects. These figures may not precisely reflect the characteristics of any given aspect, and are not necessarily intended to define or limit specific embodiments within the scope of this technology. Further, certain aspects may incorporate features from a combination of figures.

DETAILED DESCRIPTION

The present teachings relate to 3-D magnesium anodes, 3-D magnesium batteries employing such anodes, and methods for making the same. 3-D magnesium batteries employing 3-D anodes of the present disclosure can eliminate the dead space that is present in conventional, 2-D magnesium batteries, thus benefitting from improved energy and power density.

3-D magnesium anodes of the present disclosure can be coated in layers with electrolyte, cathode material, and current collector, resulting in an apparatus in which discharge ionic flow proceeds in multiple, or all directions. 3-D magnesium anodes can be prepared by a method that includes pulsed electrodeposition of magnesium onto a suitable substrate.

Figure 1A:
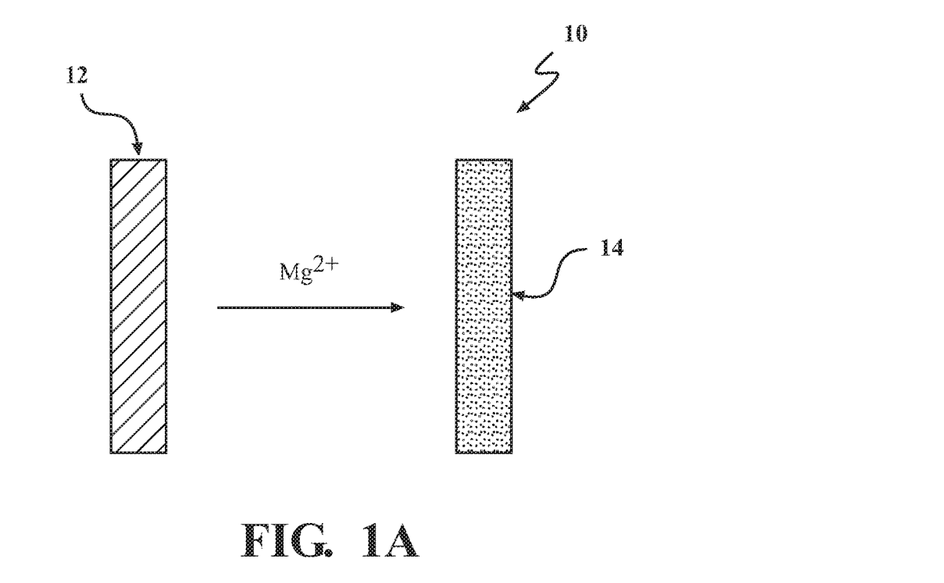
FIG. 1A is a schematic representation of a battery in which active cations flow from anode to cathode in one direction during discharge.
Figure 1B:
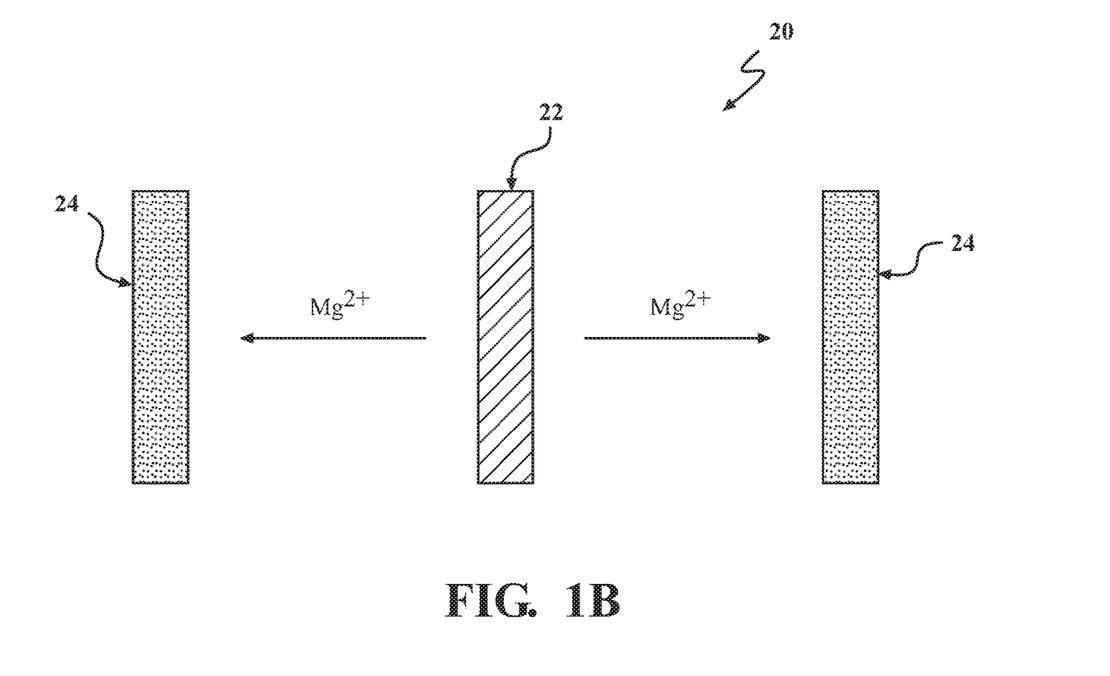
FIG. 1B is a schematic representation of a battery in which active cations flow from anode to cathode in two opposing directions during discharge.
Figure 1C:
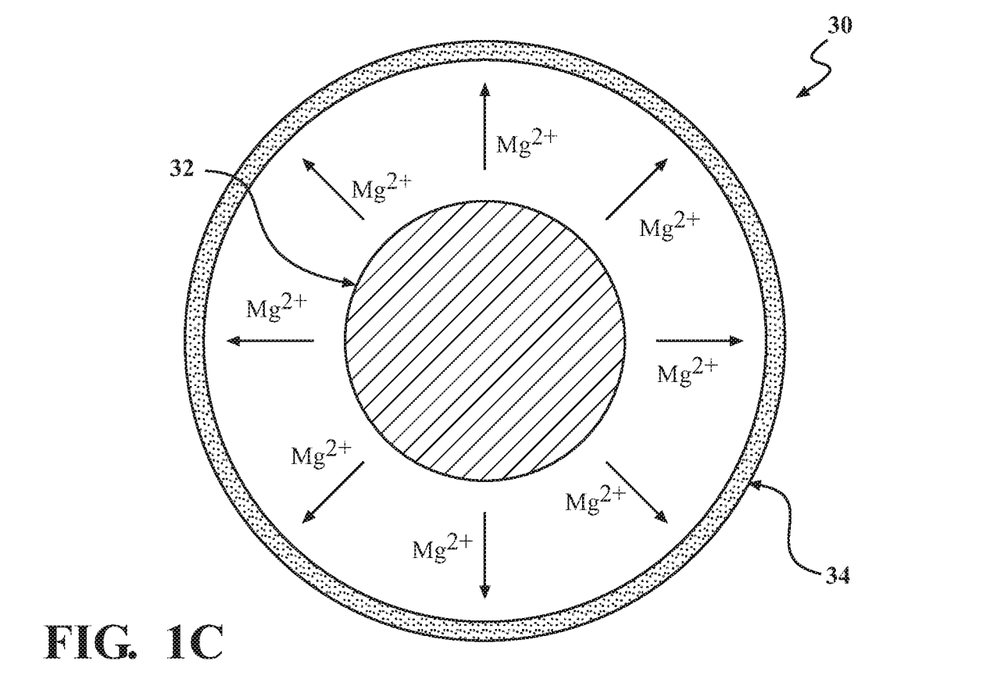
FIG. 1C is a schematic representation of a battery in which active cations flow from anode to cathode in multiple opposing directions during discharge.
Figure 1D:
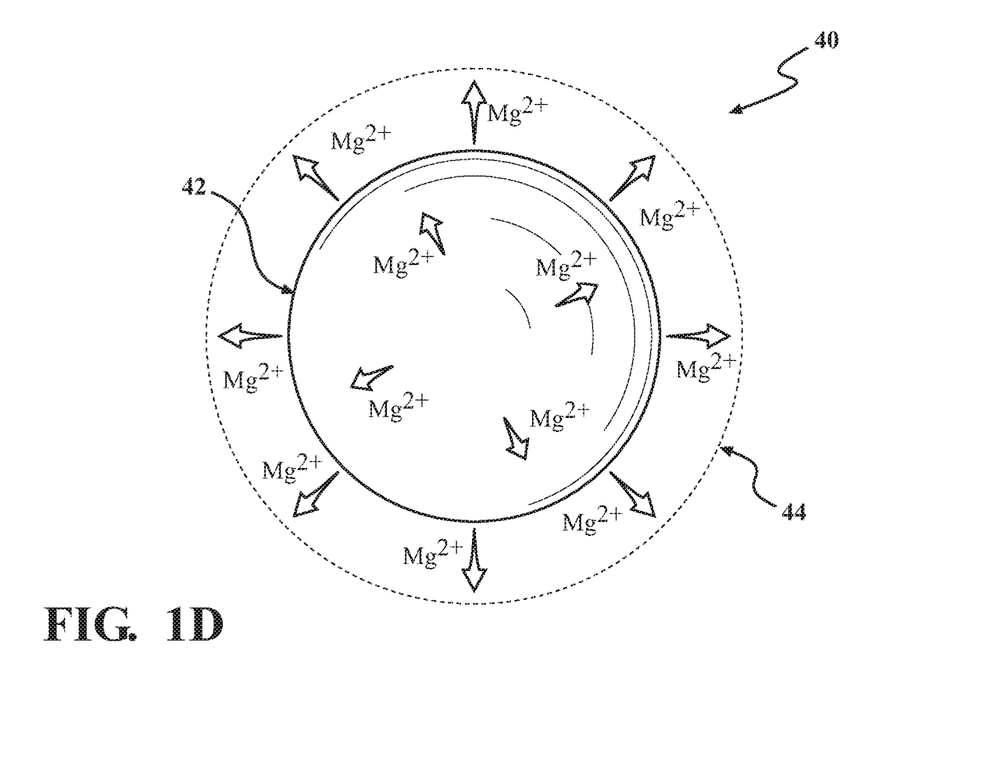
FIG. 1D is a schematic representation of a battery in which active cations flow from anode to cathode in all opposing directions during discharge.

Thus, a 3-D magnesium electrochemical cell (referred to alternatively as a "3-D Mg cell") is disclosed. As used herein, the phrase "3-D Mg cell" refers to a magnesium voltaic cell in which active ion (i.e. $Mg^{2+}$) flows from the anode to cathode during discharge proceeds in at least two opposing directions. With reference to FIG. 1A, in a conventional (i.e. two dimensional) magnesium cell 10, the flow of magnesium ions, from anode 12 to cathode 14, during battery discharge is unidirectional. By contrast, and with reference to FIG. 1B, in a 3-D magnesium battery 20 of the present disclosure, magnesium ion flow from anode 22 to cathode 24 during battery discharge proceeds in at least two opposing directions. In some implementations, and with reference to FIG. 1C, magnesium ion flow in a 3-D cell 30 from the anode 32 to the cathode 34 during battery discharge can proceed in multiple opposing directions. In a subset of such implementations, and with reference to FIG. 1D, magnesium ion flow from anode 42 to cathode 44 during cell 40 discharge can occur in all opposing directions.

Thus, and with reference to FIGS. 2A-2C and 3, a 3-D magnesium battery 100 according to the present teachings has a magnesium anode 110. A magnesium anode 110 of the present disclosure will typically include magnesium metal, when at least partially charged. In some variations, however, a magnesium anode can be a magnesium insertion anode, having a material capable of reversible magnesium insertion. Suitable materials for magnesium insertion anodes can include, without limitation: other metals such as tin, indium, bismuth, and alloys; and metal oxides, such as $Li_4Ti_5O_{12}$ spinel. The magnesium anode can be any shape, including a sheet, a wire, a perforated sheet, a mesh, or a foam. In many implementations, it will be desirable for the magnesium anode to have high surface area. In particular implementations, and as discussed in greater detail below, the magnesium anode 110 will be magnesium foam.

As shown in FIGS. 2A-2C and 3, the magnesium anode 110 is coated on at least two opposing surfaces with a continuous protective layer 120, thereby forming a protected anode 300. The protective layer 120 is electronically non-conductive but porous to and/or conductive of $Mg^{2+}$. In some implementations, the protective layer 120 can have ionic conductivity toward $Mg^{2+}$ of at least 0.01 mS/cm, or 0.1 mS/cm, or 1 mS/cm, or 10 mS/cm. In some implementation, the protective layer 120 can have electronic conductivity less than $10^{-8}$ S/cm, or less than $10^{-9}$ S/cm, or less than $10^{-10}$ S/cm. In various implementations, the protective layer 120 can be a solid, a semi-solid or gel-like material, or a liquid. Suitable, non-limiting, examples of materials that can be used as protective layer 120 include solid magnesium electrolytes (such as those disclosed in U.S. Pat. No. 9,640,836 or U.S. patent application Ser. No. 15/332,684, each of which is hereby incorporated by reference in its entirety); solvo-ionic liquid electrolytes (such as those disclosed in U.S. Pat. No. 9,362,594, hereby incorporated by reference in its entirety); or other ionic liquid electrolytes (such as those disclosed in U.S. Pat. No. 9,455,473, hereby incorporated by reference in its entirety).

In some implementations, the protective layer 120 can include a polymeric material, preferably one that is polymerized from a solution of monomers and/or oligomers contacting the magnesium anode 110, such as by addition of a catalyst, electropolymerization, etc. In particular examples, the protective layer 120 can include a polymer or co-polymer of a methacrylic acid ester, including, without limitation poly(glycidyl methacrylate) and poly(3-sulfopropyl methacrylate).

Figure 2A:
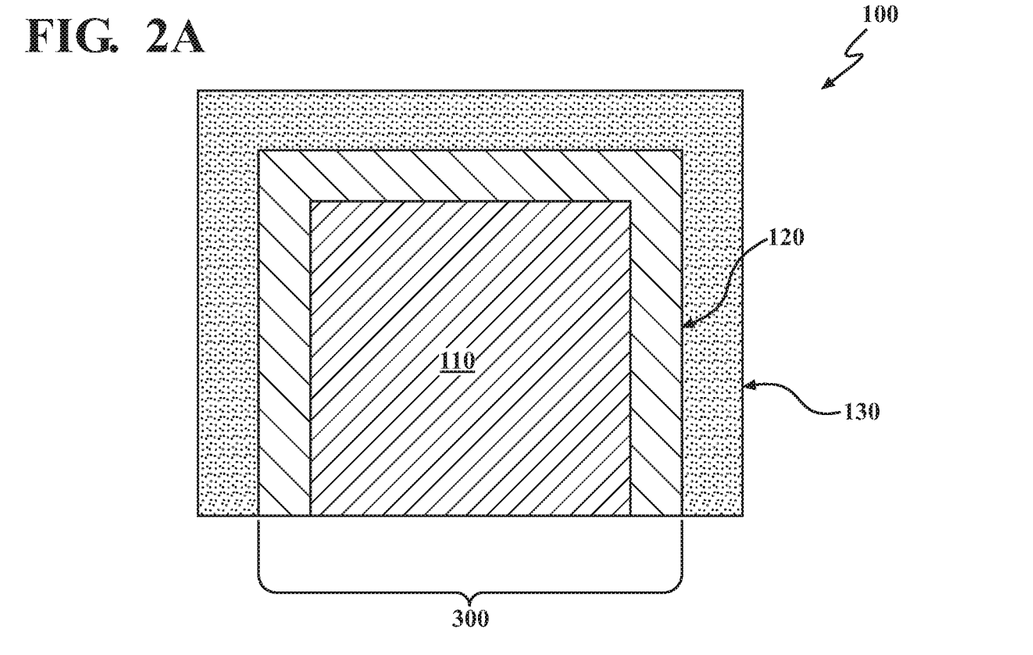
FIG. 2A is a cross-sectional view of a 3-D magnesium voltaic cell according to the present teachings, having a continuous protective layer contacting a magnesium anode on two opposing sides.
Figure 2B:
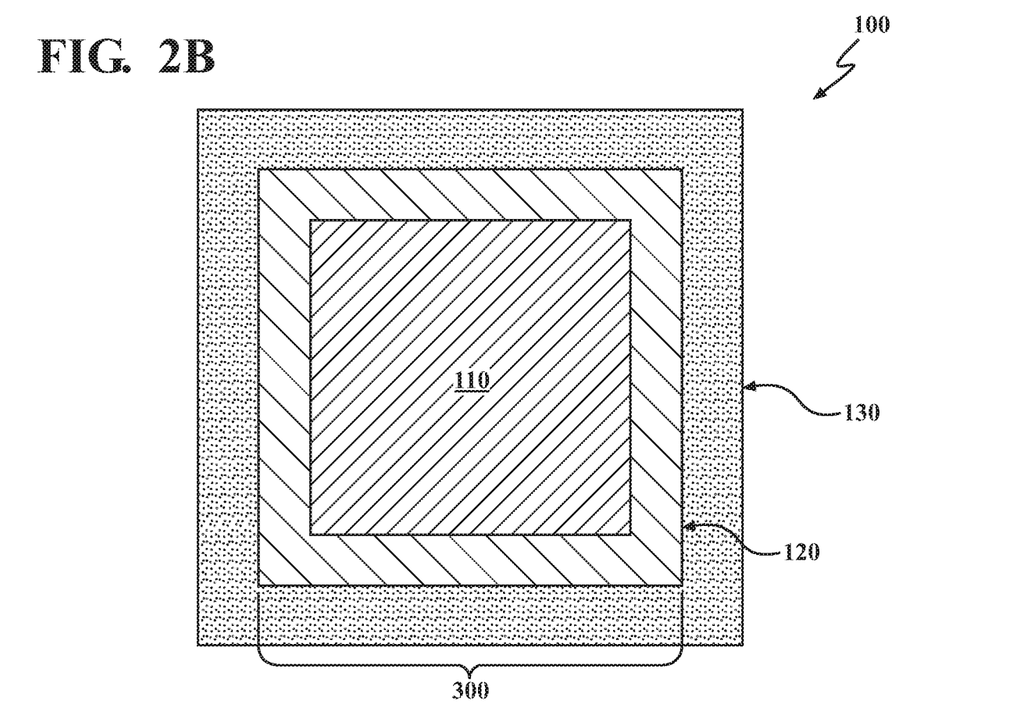
FIG. 2B is a cross-sectional view of a 3-D magnesium voltaic cell according to the present teachings, having a continuous protective layer contacting a magnesium anode on multiples opposing sides.
Figure 2C:
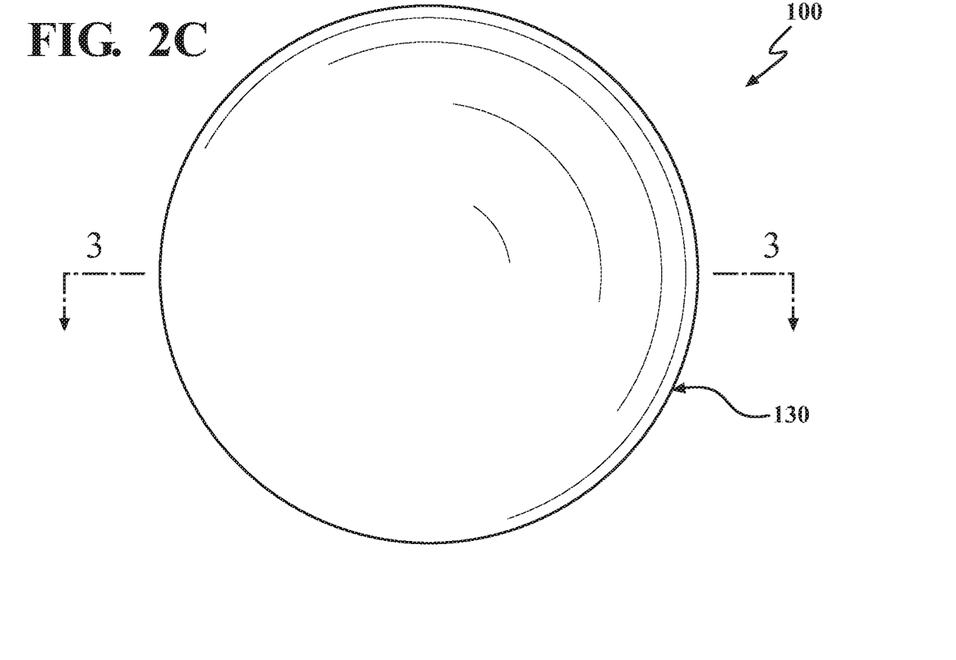
FIG. 2C is a perspective view of a 3-D magnesium voltaic cell according to the present teachings, having a continuous protective layer contacting a magnesium anode on all opposing sides
Figure 3:
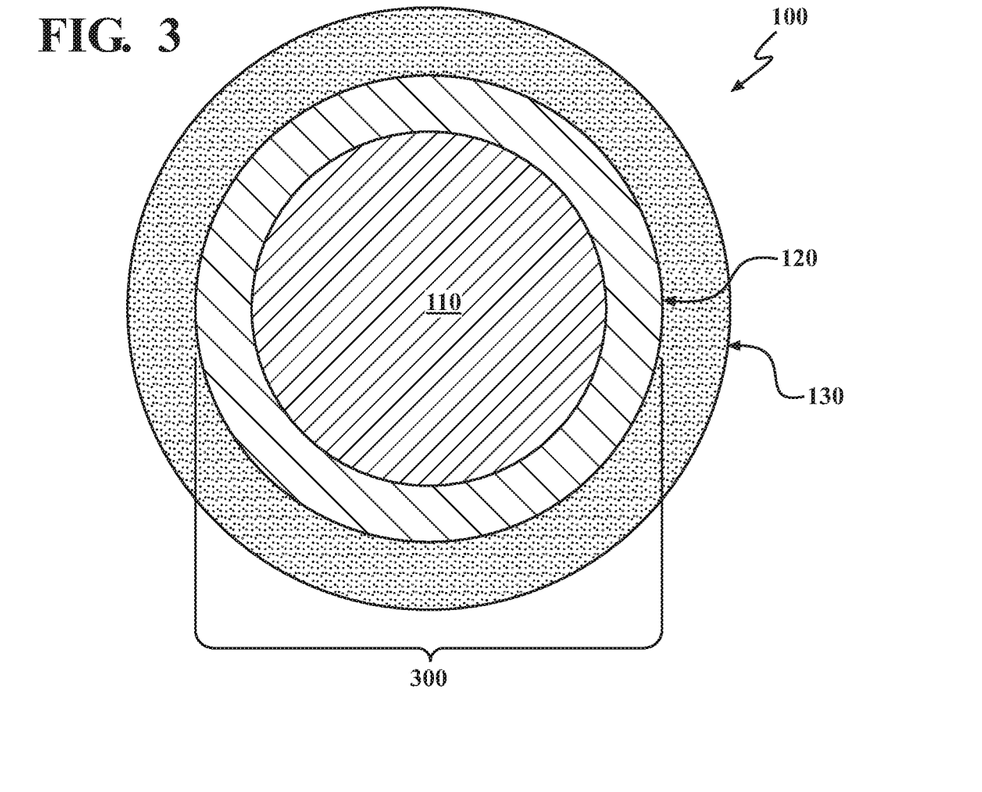
FIG. 3 is a cross-sectional view of the 3-D magnesium voltaic cell of FIG. 2C, along the line 3-3.

The term "continuous", as used above in the expression, "continuous protective layer" means that a magnesium ion could conductively travel from any part of the protective layer to any other part of the protective layer without leaving the protective layer. In some implementations, the magnesium anode 110 will be coated on multiple opposing surfaces with the continuous protective layer 120, also forming a protected anode 300, as shown in FIG. 2C. In some implementations, the magnesium anode 110 will be coated on all available surfaces with the continuous protective layer 120 as shown in FIGS. 2C and 3. The expression, "all available surfaces" refers to all surfaces of the magnesium anode 110 that are not contacted by an anodic current collector.

As shown in FIGS. 2A-2C and 3, the protective layer 120 of the protected anode 300 is coated on at least two opposing surfaces with a continuous cathode layer 130, thereby forming the 3-D magnesium voltaic cell 100. In many implementations, all available surfaces of the protective layer 120 of the protected anode 300 will be coated with the continuous cathode layer 130 (FIGS. 2C and 3), where "all available surfaces of the protective layer" refers to all surfaces of the protective layer 120 not contacted by the magnesium anode 110 or an anodic current collector. It will be appreciated that the cathode layer 130 does not contact any surface of the magnesium anode 110. The continuous cathode layer will generally be electrically conductive and conductive of magnesium ions. Similar to the continuous protective layer 120, the term "continuous", as used above in the expression, "continuous cathode layer" means that an electron could conductively travel from any part of the cathode layer to any other part of the cathode layer without leaving the cathode layer.

In various implementations, the continuous cathode layer 130 can be a solid, including a powder or mixture of powders; a semi-solid such as a gel; or a viscous liquid. In some implementations, the continuous cathode layer 130 can include a suspension off one or more powders in a solvent or solution, referred to hereinafter as a slurry cathode 221. The continuous cathode layer 130 will generally include an electronic conductor, an ionic conductor; and a reversible active material storage component. In many implementations, the ionic conductor can be a magnesium ion conductor, and the reversible active material storage component can be a reversible magnesium storage component. In some implementations, the continuous cathode layer 130 can have ionic conductivity toward $Mg^{2+}$ of at least 0.01 mS/cm, or 0.1 mS/cm, or 1 mS/cm, or 10 mS/cm. In some implementation, the continuous cathode layer 130 can have electronic conductivity of at least 0.01 S/cm, or 0.1 S/cm, or 1 S/cm, or 10 S/cm.

In instances where the continuous cathode layer 130 includes a solvent, the solvent can be any electrochemically compatible solvent or solvents having sufficient magnesium ion solubility. In some implementations, the solvent will be a multidentate ether solvent, such as dimethoxyethane (dimethyl glycol, monoglyme, or glyme), diethylene glycol dimethyl ether (diglyme), triethylene glycol dimethyl ether (triglyme), tetraethylene glycol dimethyl ether (tetraglyme), another polyether such as a polyethylene glycol (PEG), or solid, high-molar-mass polymers (for example, poly(ethylene oxide), PEO). In some instances, one or more solvents will be employed to apply the continuous cathode layer, but will substantially or entirely evaporate after application.

In various implementations, the reversible active material storage component can be any material suitable for use as a cathode in a magnesium electrochemical cell. Non-limiting examples can include materials such as a Chevrel phase molybdenum composition such as $Mo_6S_8$, $FeSiO_4$, K-$\alpha MnO_2$, $MgFePO_4$, sulfur, organosulfur compounds, or any other suitable materials. In some implementations, the reversible magnesium storage component will be an organic cathode material, such as a conjugated carbonyl material, including simple or complex quinones, such as benzoquinone; 2,6-dimethoxybenzoquinone; or 5,7,12,14-Pentacenetetrone; quinone derivatives, such as purpurin; dianhydrides, such as pyromellitic anhydride; and other conjugated carbonyl materials, such as indigo carmine. In some specific implementations, the reversible magnesium storage component will be $Mo_6S_8$, 2,6-dimethoxybenzoquinone, or 5,7,12,14-pentacenetetrone.

In many implementations, the electronic conductor will be a powder of a conductive material, such as a metal, a conductive polymeric material, or conductive carbon such as Ketjen black. The ionic conductor can be a magnesium electrolyte, including those discussed above with reference to the continuous protection layer 210. In some specific implementations, a magnesium ion conductor can include an anion having any formula of:

$$[B_yH_{(y-z-i)}R_zX_i]^{2-} \quad \text{Anion Formula I,}$$

$$[CB_{(y-1)}H_{(y-z-i)}R_zX_i]^{-} \quad \text{Anion Formula II,}$$

$$[C_2B_{(y-2)}H_{(y-t-j-1)}R_tX_j]^{-} \quad \text{Anion Formula III,}$$

$$[C_2B_{(y-3)}H_{(y-t-j)}R_tX_j]^{-} \quad \text{Anion Formula IV, or}$$

$$[C_2B_{(y-3)}H_{(y-t-j-1)}R_tX_j]^{2-} \quad \text{Anion Formula V,}$$

wherein y is an integer within a range of 6 to 12; (z+i) is an integer within a range of 0 to y; (t+j) is an integer within a range of 0 to (y−1); and X is F, Cl, Br, I, or a combination thereof. Substituent R as included in Anion Formulae I-IV can be alkyl, aryl, alkoxy, aryloxy, a fluorinated derivative of the aforementioned, or a moiety having any combination of the aforementioned. In some implementations, a magnesium ion conductor will be $Mg(CB_{11}H_{12})_2$.

In some implementations, a slurry cathode can include a binder, such as poly(1,1-difluoroethylene) or polytetrafluoroethylene. All or part of the outer surfaces of the continuous cathode layer 130 can be contacted by a cathodic current collector, such as a copper foil.

In a specific embodiment, a slurry cathode can include 20 percent, by volume, 2,6-dimethoxy benzoquinone as reversible magnesium storage component, 0.8%, by volume, Ketjen black as electronic conductor, and 79.2%, by volume, 0.3 M $Mg(CB_{11}H_{12})_2$ in tetraglyme. In another specific embodiment, a slurry cathode can include 20 percent, by volume, 5,7,12,14-pentacenetetrone as reversible magnesium storage component, 0.8%, by volume, Ketjen black as electronic conductor, and 79.2%, by volume, 0.3 M $Mg(CB_{11}H_{12})_2$ in tetraglyme.

In some particular implementations, a 3-D magnesium voltaic cell 100 can have a slurry cathode that replaces the magnesium ion conductor with a conductor of a second, non-magnesium active cation; and replaces the reversible magnesium storage component with a reversible storage component of the second active cation. For example, a 3-D magnesium voltaic cell of the present disclosure could have a slurry cathode having $NaCB_{11}H_{12}$, and any suitable Na-ion battery cathode material. Such a voltaic cell would thus be a 3-D Mg/Na dual-ion voltaic cell.

Figure 4A:
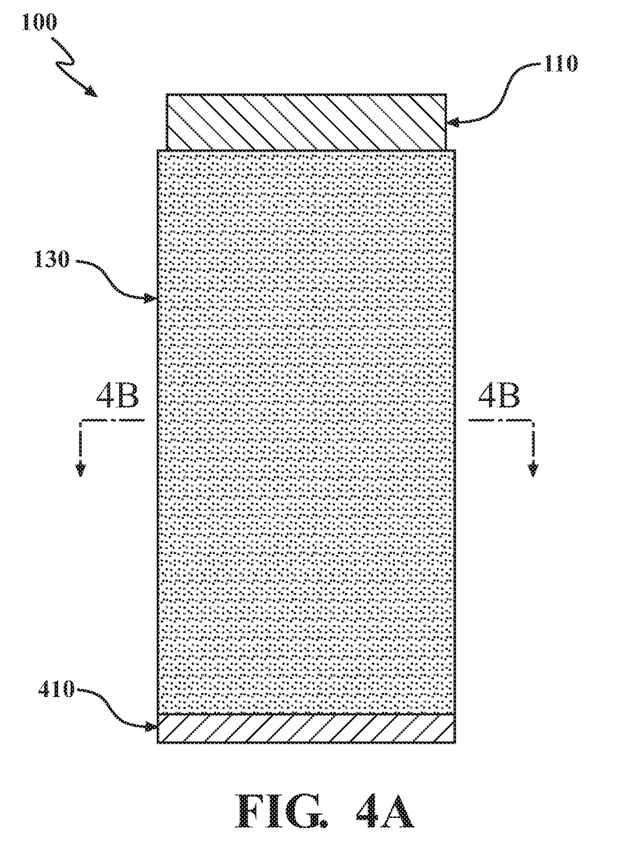
FIG. 4A is a schematic drawing of an exemplary prototype 3-D magnesium voltaic cell 100 of the present disclosure
Figure 4B:
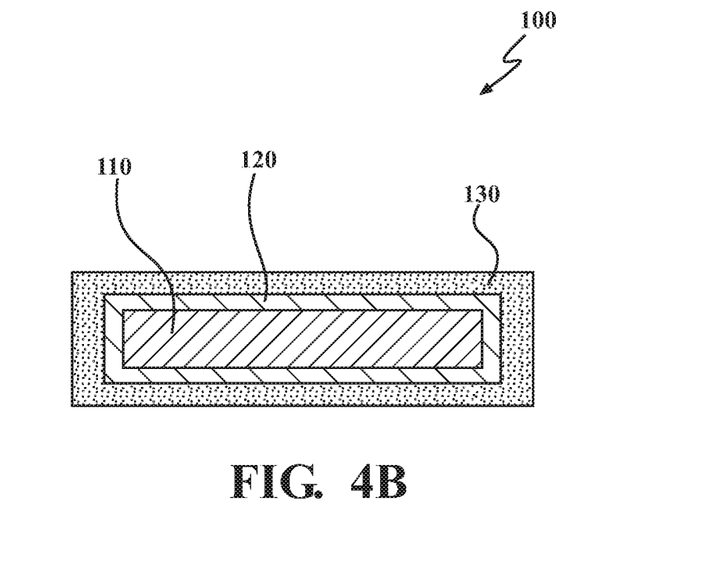
FIG. 4B is a cross section of the 3-D magnesium voltaic cell 100 of FIG. 4A, viewed along the line 4B-4B.
Figure 4C:
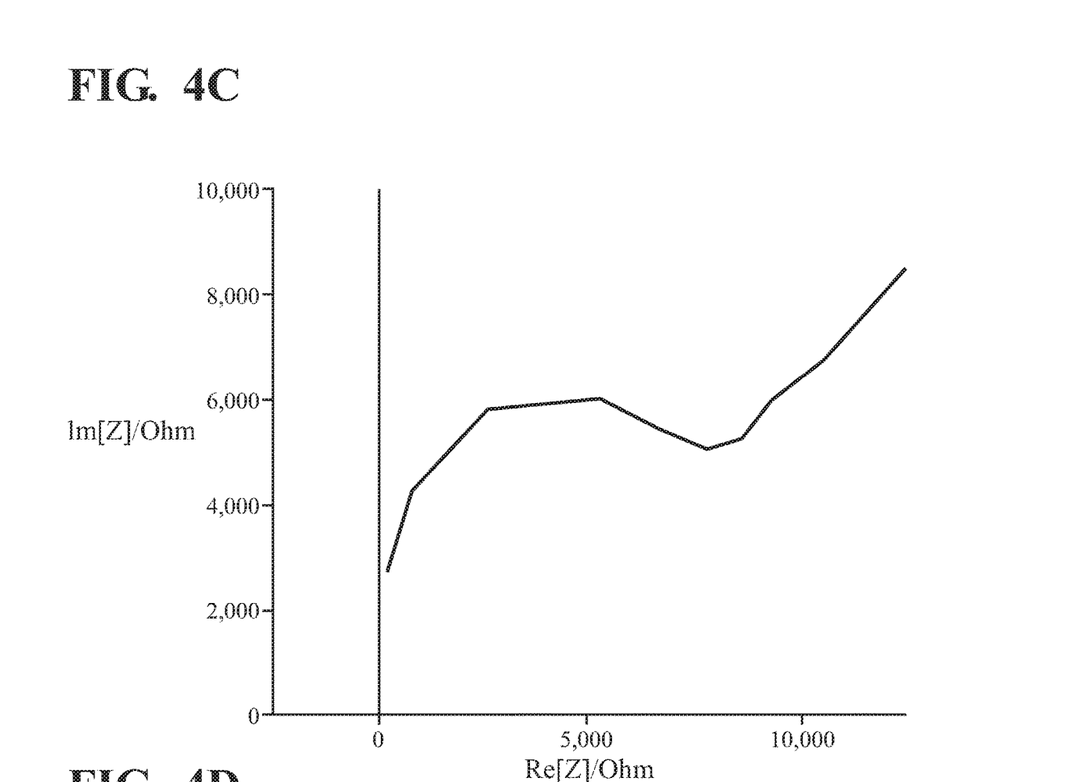
FIG. 4C illustrates a Nyquist plot for the cell of FIGS. 4A and 4B.
Figure 4D:
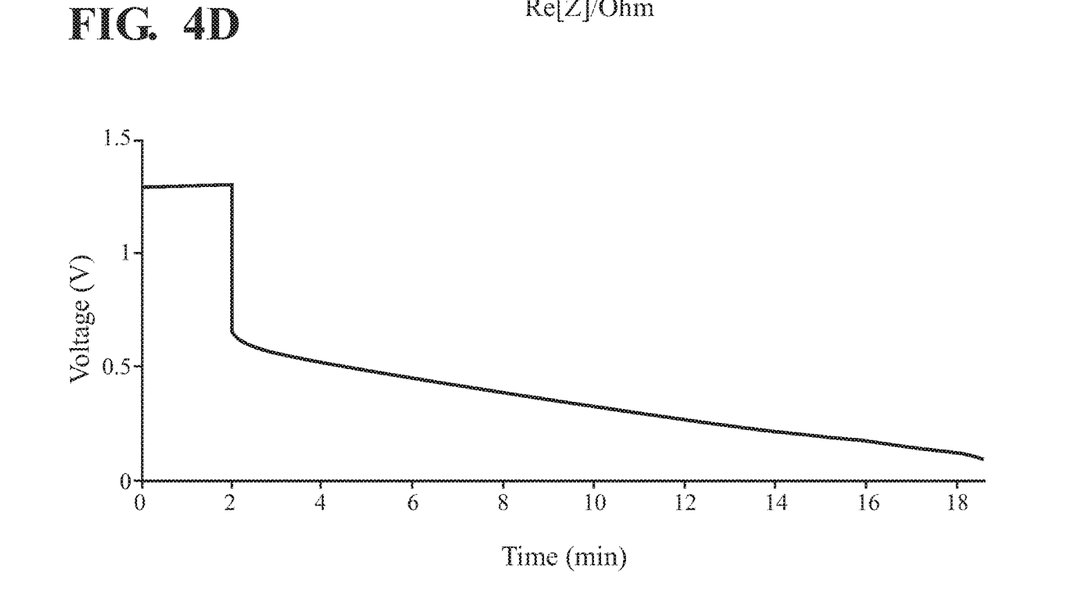
FIG. 4D is a plot of discharge electric potential of the cell of FIGS. 4A and 4B as a function of time.

FIG. 4A is a schematic view of an exemplary prototype 3-D magnesium voltaic cell 100 of the present disclosure. FIG. 4B is a cross-sectional view of the cell 100 of FIG. 4A. The magnesium anode 110 is a strip of magnesium foil, and is coated on portions of two pairs of opposing surfaces with a solid-state, continuous protective layer 120. Two pairs of opposing outer surfaces of the continuous protective layer 120 are coated with a continuous cathode layer 130 containing Ketjen black as the electronic conductor. The magnesium ion conductor is an ionic liquid consisting of equimolar quantities of N-Methyl-N-propylpiperidinium bis(trifluoromethane)sulfonimide (PP13 TFSI) and $MgTFSI_2$, as well as dimethoxyethaner, and also a 1:3 molar ratio of $Mg(BH_4)_2$:$LiBH_4$. A copper foil current collector 410 contacts the continuous cathode layer 130. FIG. 4B is a line drawing reproduction of an electron micrograph of a cross section of the 3-D magnesium voltaic cell 100 of FIG. 4A. FIG. 4C illustrates a Nyquist plot demonstrating that the cell displays good ionic conductivity. FIG. 4D shows the discharge voltage profile of the cell of FIGS. 4A and 4B, where the cell provided discharge potential expected for the utilized cathode material. This result highlights the successful magnesiation of the cathode material and hence successful operation of the cell.

A magnesium foam is a structure that is porous in three dimensions, typically with porosity greater than 0.5 and average pore size less than 1 mm, and that is composed of magnesium metal, or at least surface coated with magnesium metal, when at least partially charged. In different implementations, porosity of the magnesium foam will be greater than 0.6, or 0.7, or 0.8, or 0.9. In some implementations, average pore size in the magnesium foam will be less than 900 µm, or less than 800 µm, or less than 700 µm, or less than 600 µm, or less than 500 µm, or less than 400 µm. In various implementations, a magnesium foam can be made by 3-D printing (i.e. CAD-directed additive fabrication), or by electroplating magnesium on to a suitable substrate, such as copper foam. In certain specific implementations, discussed in detail below, a magnesium foam can be made by pulsed electrodeposition of magnesium onto copper foam.

Figure 5:
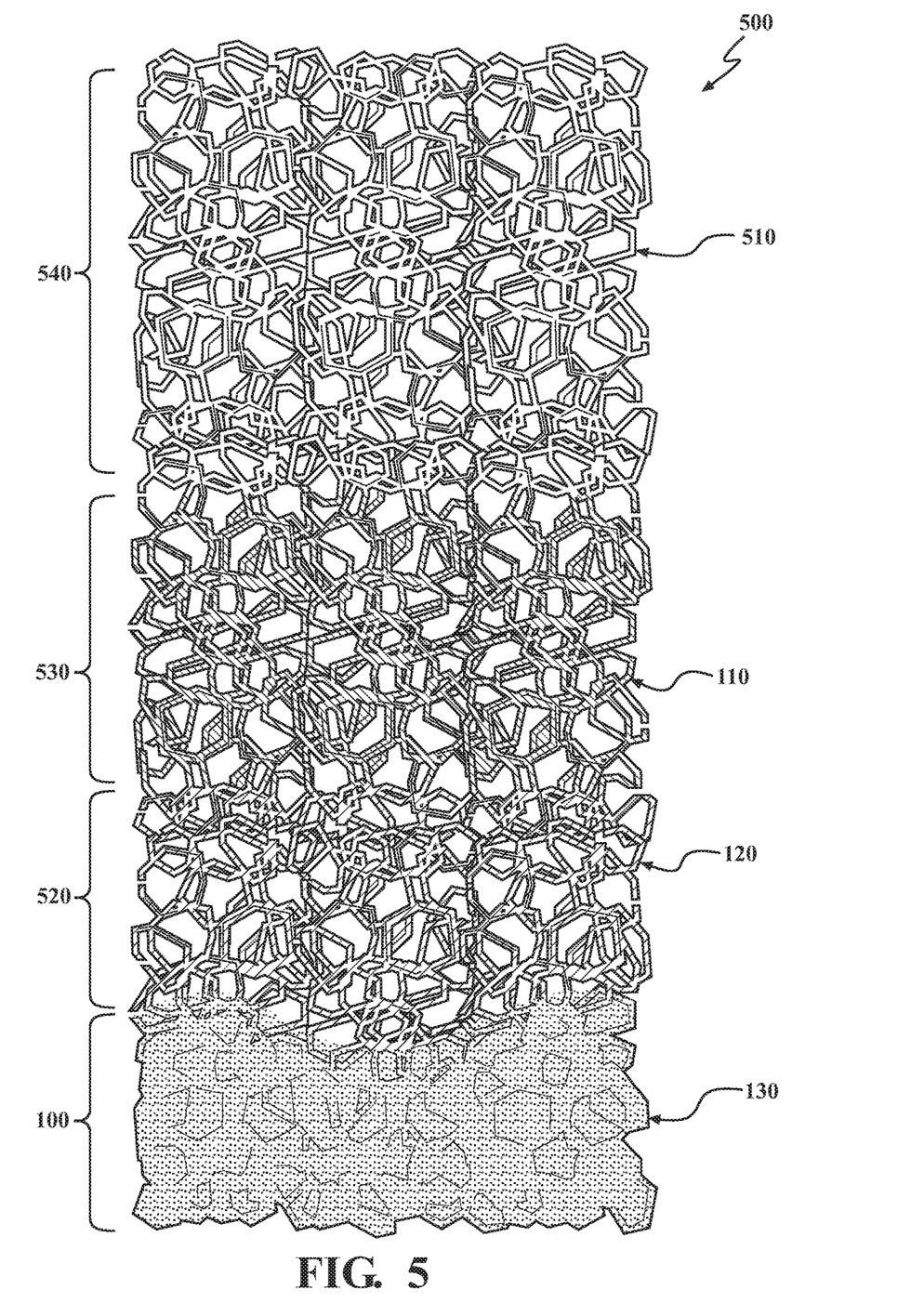
FIG. 5 is a perspective view of a 3-D magnesium voltaic cell having a magnesium foam anode, with portions of the continuous protective layer and the continuous cathode layer removed for clarity.

In implementations in which the magnesium anode 110 is a magnesium foam anode, the magnesium foam will generally be coated on all available surfaces with the continuous protective layer 120. Similarly, all available surfaces of the protective layer 120 will typically be coated with the continuous cathode layer 130. FIG. 5 shows a perspective view of a 3-D magnesium voltaic cell 100 having a magnesium foam anode, with portions of the continuous protective layer 120 and the continuous cathode layer 130 removed for clarity. In the completed cell 100, the continuous cathode layer 130 substantially impregnates and fills pores of the magnesium foam anode. In region 520, the continuous cathode layer 130 is removed, revealing the underlying continuous protective layer 120 that coats the magnesium foam anode. In region 530, the continuous protective layer 120 is removed, revealing the underlying magnesium anode 110, consisting in this example of a layer of magnesium electrodeposited on a copper foam substrate 510. In region 540, the layer of electrodeposited layer of magnesium is removed, revealing the underlying copper foam substrate 510.

Figure 6A:
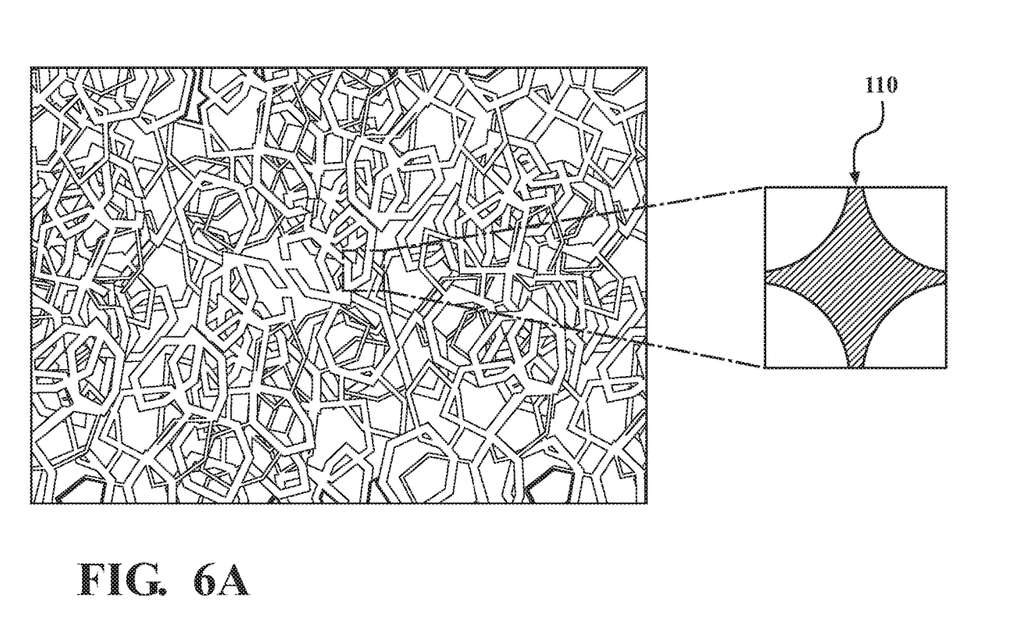
FIG. 6A is a line drawing of an electron micrograph of a portion of a magnesium foam anode, with a schematic representation of a portion of the anode offset.
Figure 6B:
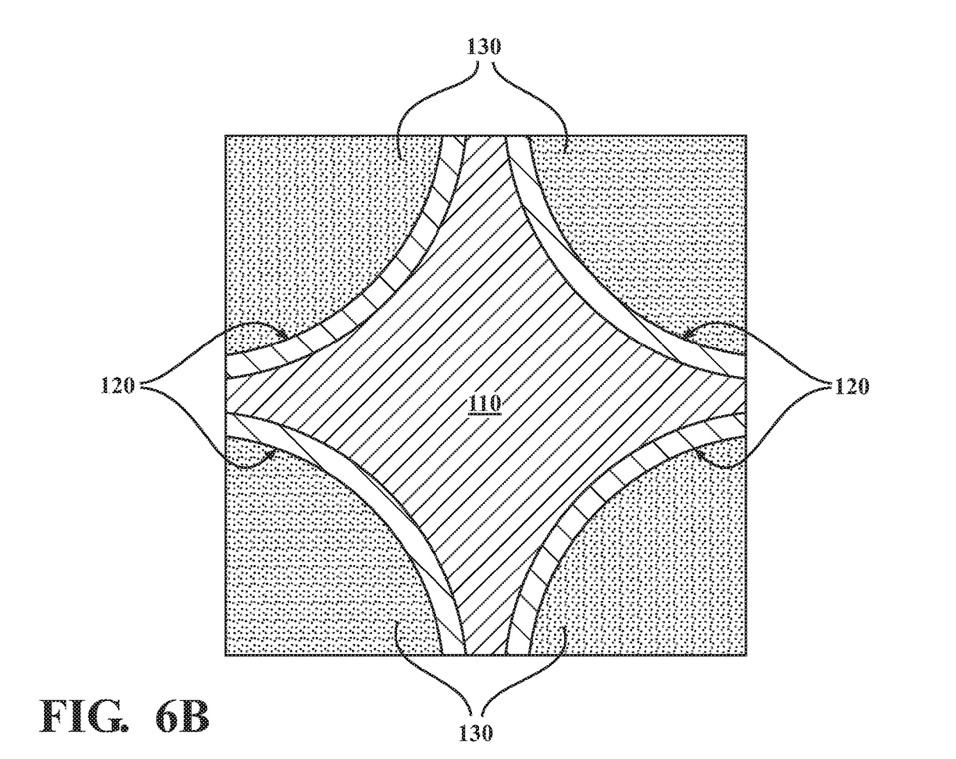
FIG. 6B is a schematic view of a portion of the magnesium foam anode of FIG. 6A, with pores impregnated with continuous protective layer and continuous cathode layer.

As shown in FIGS. 6A and 6B, such a cell will typically have the pores of the magnesium anode 110 impregnated and filled with the successive layers of continuous protective layer 120 and continuous cathode layer 130. FIG. 6A is a line drawing of an electron micrograph of an exemplary magnesium anode 110 consisting of a magnesium foam. FIG. 6A additionally includes an offset schematic view of a portion of the magnesium anode 110 at increased magnification. The offset schematic of FIG. 6A includes a four-pointed portion of the anode 110 with pore spaces in the corners of the window. FIG. 6B shows the offset schematic of FIG. 6A, in which the anode 110 is coated with a continuous protective layer 120. The pores are further impregnated and filled with continuous cathode layer 130, thus completing the cell.

A method for making a 3-D magnesium electrochemical cell includes a step of coating a magnesium anode on at least two opposing sides with a continuous protective layer, to form a protected 3-D magnesium anode. In many implementations, this step will include coating a magnesium foam anode on all available surfaces with a continuous protective layer. The step of coating surfaces of the magnesium anode with the continuous protective layer can be achieved, for example, by submerging part or all of a magnesium anode in an ionic liquid or solvo-ionic liquid containing magnesium, or a solution or suspension containing a magnesium electrolyte. In implementations in which the magnesium anode is submerged in a solution or suspension containing a magnesium electrolyte, and the solution or suspension contains unwanted solvent, the resulting protected 3-D anode may be dried prior to performance of additional step.

The step of coating a magnesium anode on at least two opposing sides with a continuous protective layer, to form a protected 3-D magnesium anode can optionally include a step of electropolymerizing a methacrylate ester.

The method for making a 3-D magnesium electrochemical cell also includes a step of coating the continuous protective layer of the protected 3-D magnesium anode on all available surfaces with a continuous cathode layer, thereby forming the 3-D magnesium cell. The continuous cathode layer of the method is the same as the continuous cathode layer 130 described above with respect to the 3-D magnesium voltaic cell 100. The step of coating the continuous protective layer of the protected 3-D magnesium anode on all available surfaces with a continuous cathode layer can be achieved, for example, by submerging part or all of a protected 3-D magnesium anode in a solution or suspension containing an electronic conductor, a magnesium ion conductor; and a reversible magnesium storage component. In implementations in which the protected 3-D magnesium anode is submerged in a solution or suspension containing an electronic conductor, a magnesium ion conductor; and a reversible magnesium storage component, and the solution or suspension contains unwanted solvent, the resulting 3-D magnesium electrochemical cell may be dried prior to performance of additional steps.

Figure 7:
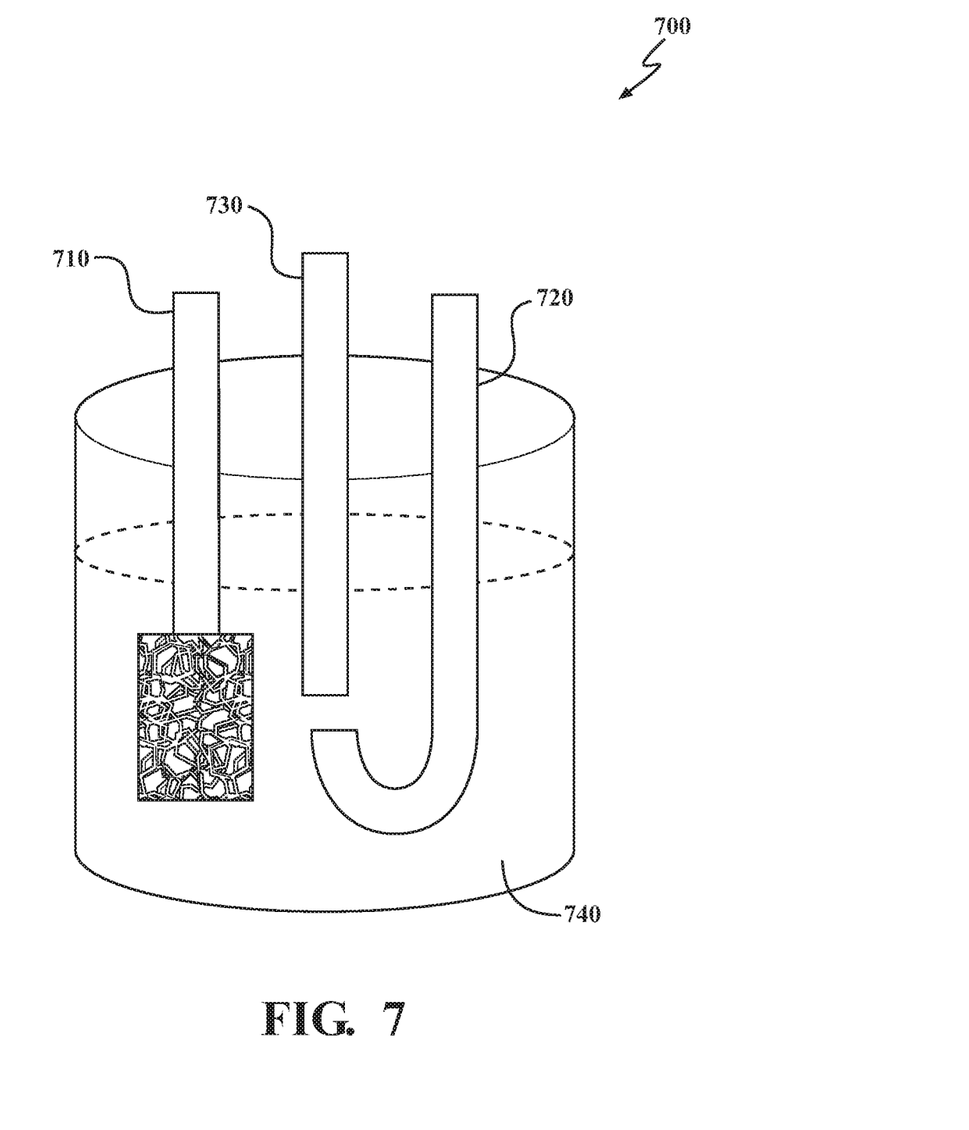
FIG. 7 is a schematic view of an exemplary electrochemical cell for pulsed electrodeposition of magnesium onto a copper substrate to make a magnesium anode.

The magnesium anode used in the method can be obtained by a step of forming a surface layer of magnesium metal on a copper substrate by pulsed electrodeposition to form magnesium anode. FIG. 7 shows a schematic view of an exemplary electrochemical cell 700 for pulsed electrodeposition of magnesium onto a copper substrate to make a magnesium anode. The cell 700 of FIG. 7 includes a copper working electrode 710, having the desired shape of the eventual magnesium anode. The cell further includes a magnesium counter electrode 720, a magnesium reference electrode 730, and electrolyte 740, such as All Phenyl Complex (e.g. $(PhMgCl)_2$—$AlCl_3$ in THF).

Figure 8A:
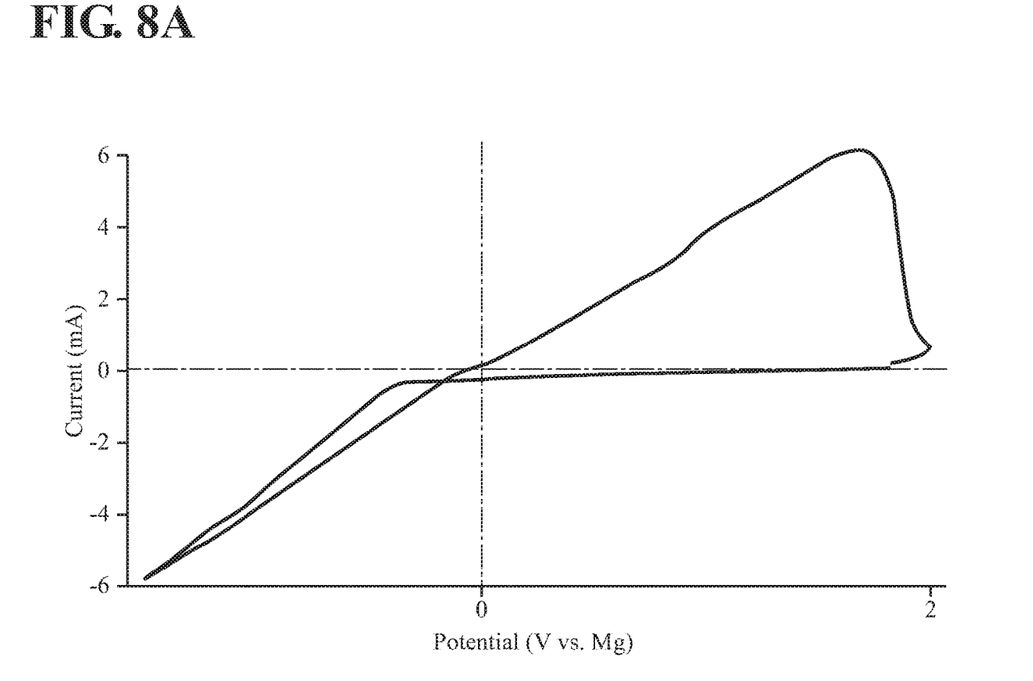
FIG. 8A shows a cyclic voltammogram for the cell of FIG. 6, across an electric potential window of −1.3 to 2.0 V.
Figure 8B:
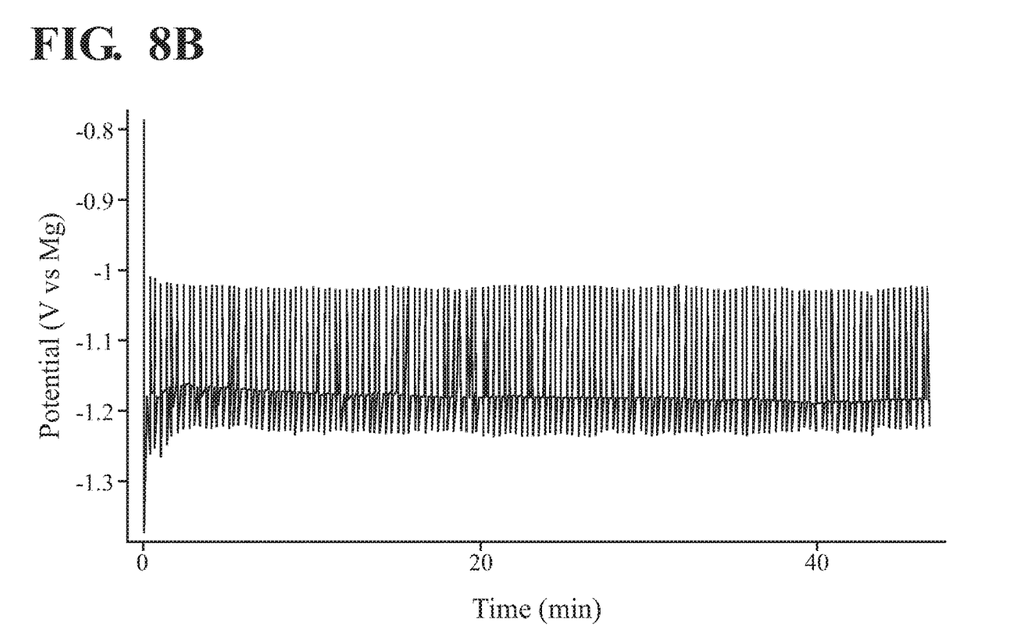
FIG. 8B shows a plot of electric potential vs. time for an exemplary pulsed galvanostatic electrodeposition, with −10 mA pulses, of magnesium onto copper foam to make a foam 3-D magnesium anode.

FIG. 8A shows a cyclic voltammogram for the cell of FIG. 7, across an electric potential window of −1.3 to 2.0 V. FIG. 8B shows a plot of electric potential vs. time for an exemplary pulsed galvanostatic electrodeposition, with −10 mA pulses, of magnesium onto copper foam to make a foam 3-D magnesium anode.

Pulsed electrodeposition can be performed by performing a series of cycles in which a pulse of current is applied to the cell 700 for a pulse duration, followed by a rest duration during which no current is applied. In different implementations, the pulse duration and the rest duration can each, independently, be within a range of 5-30 seconds. In certain specific implementations, the pulse time and the rest time can each be 10 sec. In various implementations, the current applied during the pulse can be −5 to −40 mA.

Table I summarizes the results of an investigation of the effect of pulse duration and rest duration on the smoothness of electrodeposited magnesium layer. In Table I, a circle indicates a very smooth magnesium surface with no dendrites, a triangle indicates a somewhat smooth surface with moderate dendrites, and an X indicates a rough magnesium surface with substantial dendrite formation. The degree of smoothness or dendrite formation, as summarized in Table I, is determined by visual examination of electron micrographs of the surfaces of the corresponding electrodeposited magnesium anodes. As shown in Table I, many of the combination of pulse duration and rest duration result in substantial dendrite formation, particularly those having long pulse duration and/or rest duration. Surprisingly, only the galvanostatic pulsed electrodeposition having pulse duration and rest duration each of 10 seconds produces a very smooth surface.

TABLE I

| Rest Time (s) | Pulse Time (s) | | | |
|---|---|---|---|---|
| | 5 | 10 | 20 | 30 |
| 5 | Δ | Δ | Δ | X |
| 10 | Δ | ◯ | Δ | Δ |
| 20 | X | Δ | Δ | X |
| 30 | X | Δ | X | X |

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A three-dimensional (3-D) magnesium voltaic cell, comprising:
    a magnesium anode, comprising magnesium metal when at least partially charged;
    a continuous protective layer contacting the magnesium anode on at least two opposing surfaces to form a protected anode, the continuous protective layer being electrically insulative, ionically conductive, and contacting the magnesium anode where an anode current collector is not present; and
    a continuous cathode layer contacting the continuous protective layer of the protected anode on at least two opposing surfaces, the continuous cathode layer comprising:
        a reversible active material storage component;
        an electronic conductor; and
        an ionic conductor.

2. The 3-D magnesium voltaic cell as recited in claim 1, wherein the continuous protective layer has ionic conductivity greater than 0.01 S/cm and electric conductivity less than $10^{-8}$ S/cm.

3. The 3-D magnesium voltaic cell as recited in claim 1, wherein the ionic conductor comprises an electrolyte for conducting a non-magnesium active cation and the reversible active material storage component comprises a cathode material configured to reversibly store the non-magnesium active cation such that the 3-D magnesium voltaic cell is a dual-ion cell.

4. The 3-D magnesium voltaic cell as recited in claim 3, wherein the ionic conductor comprises a sodium electrolyte and the reversible active material storage component comprises a sodium cathode material.

5. The 3-D magnesium voltaic cell as recited in claim 4, wherein the sodium electrolyte comprises $Na(CB_{11}H_{12})$.

6. A three-dimensional (3-D) magnesium voltaic cell, comprising:
    a magnesium anode, comprising magnesium metal when at least partially charged;
    a continuous protective layer contacting the magnesium anode on at least two opposing surfaces to form a protected anode, the continuous protective layer being electrically insulative, ionically conductive, and contacting the magnesium anode where an anode current collector is not present; and
    a continuous cathode layer contacting the continuous protective layer of the protected anode on at least two opposing surfaces, the continuous cathode layer comprising:
        a reversible active material storage component;
        an electronic conductor; and
        an ionic conductor, wherein the continuous protective layer has ionic conductivity greater than 0.01 S/cm and electric conductivity less than $10^{-8}$ S/cm.

7. The 3-D magnesium voltaic cell as recited in claim 6, wherein the ionic conductor comprises an electrolyte for conducting a non-magnesium active cation.

8. The 3-D magnesium voltaic cell as recited in claim 7, wherein the reversible active material storage component comprises a cathode material configured to reversibly store the non-magnesium active cation.

9. The 3-D magnesium voltaic cell as recited in claim 8, wherein the 3-D magnesium voltaic cell is a dual-ion cell.

10. The 3-D magnesium voltaic cell as recited in claim 6, wherein the ionic conductor comprises a sodium electrolyte and the reversible active material storage component comprises a sodium cathode material.

11. The 3-D magnesium voltaic cell as recited in claim 10, wherein the sodium electrolyte comprises $Na(CB_{11}H_{12})$.

12. The 3-D magnesium voltaic cell as recited in claim 6, wherein:
the ionic conductor comprises an electrolyte for conducting a non-magnesium active cation and the reversible active material storage component comprises a cathode material configured to reversibly store the non-magnesium active cation such that the 3-D magnesium voltaic cell is a dual-ion cell;
the ionic conductor comprises a sodium electrolyte and the reversible active material storage component comprises a sodium cathode material; and
the sodium electrolyte comprises $Na(CB_{11}H_{12})$.

13. A three-dimensional (3-D) magnesium voltaic cell, comprising:
a magnesium anode, comprising magnesium metal when at least partially charged;
a continuous protective layer contacting the magnesium anode on at least two opposing surfaces to form a protected anode, the continuous protective layer being electrically insulative, ionically conductive, and contacting the magnesium anode where an anode current collector is not present; and
a continuous cathode layer contacting the continuous protective layer of the protected anode on at least two opposing surfaces, the continuous cathode layer comprising:
a reversible active material storage component;
an electronic conductor; and
an ionic conductor comprising an electrolyte for conducting a non-magnesium active cation.

14. The 3-D magnesium voltaic cell as recited in claim 13, wherein the continuous protective layer has ionic conductivity greater than 0.01 S/cm and electric conductivity less than $10^{-8}$ S/cm.

15. The 3-D magnesium voltaic cell as recited in claim 14, wherein the reversible active material storage component comprises a cathode material configured to reversibly store the non-magnesium active cation.

16. The 3-D magnesium voltaic cell as recited in claim 15, wherein the 3-D magnesium voltaic cell is a dual-ion cell.

17. The 3-D magnesium voltaic cell as recited in claim 16, wherein the ionic conductor comprises a sodium electrolyte and the reversible active material storage component comprises a sodium cathode material.

18. The 3-D magnesium voltaic cell as recited in claim 17, wherein the sodium electrolyte comprises $Na(CB_{11}H_{12})$.

19. The 3-D magnesium voltaic cell as recited in claim 13, wherein:
the continuous protective layer has ionic conductivity greater than 0.01 S/cm and electric conductivity less than $10^{-8}$ S/cm;
the reversible active material storage component comprises a cathode material configured to reversibly store the non-magnesium active cation such that the 3-D magnesium voltaic cell is a dual-ion cell;
the ionic conductor comprises a sodium electrolyte and the reversible active material storage component comprises a sodium cathode material; and
the sodium electrolyte comprises $Na(CB_{11}H_{12})$.

* * * * *